United States Patent [19]
Lindley

[11] 4,379,374
[45] Apr. 12, 1983

[54] RODENT TRAP

[75] Inventor: Donald C. Lindley, Irvine, Calif.

[73] Assignee: Contectrol Incorporated, Costa Mesa, Calif.

[21] Appl. No.: 176,768

[22] Filed: Aug. 11, 1980

[51] Int. Cl.³ ............................................. A01M 23/18
[52] U.S. Cl. ............................................. 43/61; 43/62
[58] Field of Search ........................................ 43/60–62

[56] References Cited

U.S. PATENT DOCUMENTS

| | | | |
|---|---|---|---|
| 68,776 | 9/1867 | Miller | 43/62 |
| 224,498 | 2/1880 | Wiggins | 43/60 |
| 491,309 | 2/1893 | Herman | 43/60 |
| 721,614 | 2/1903 | Smith | 43/62 |
| 1,273,185 | 7/1918 | Reich | 43/60 |
| 1,684,484 | 9/1928 | Gilkey | 43/61 |
| 2,216,644 | 10/1940 | Heldman | 43/61 |
| 2,885,820 | 5/1959 | Maggio | 43/61 |
| 3,177,608 | 4/1965 | Lindelow | 43/61 |

Primary Examiner—Stephen G. Kunin
Assistant Examiner—K. Bradford Adolphson
Attorney, Agent, or Firm—Donald D. Mon

[57] ABSTRACT

A rodent trap comprised of an enclosure with a doorway, and a base plate. The enclosure is hinged to tilt bodily downwardly to close the doorway when tripped. Latching means is adapted to hold the enclosure in an open, ready, position. The enclosure is divided into two chambers, with the doorway in one and a tripping mechanism in the other. The tripping mechanism is mounted in said other chamber and linked to the latch means so that the weight of a rodent on it will release the latch means and enable the enclosure to tilt downwardly to close the doorway.

8 Claims, 5 Drawing Figures

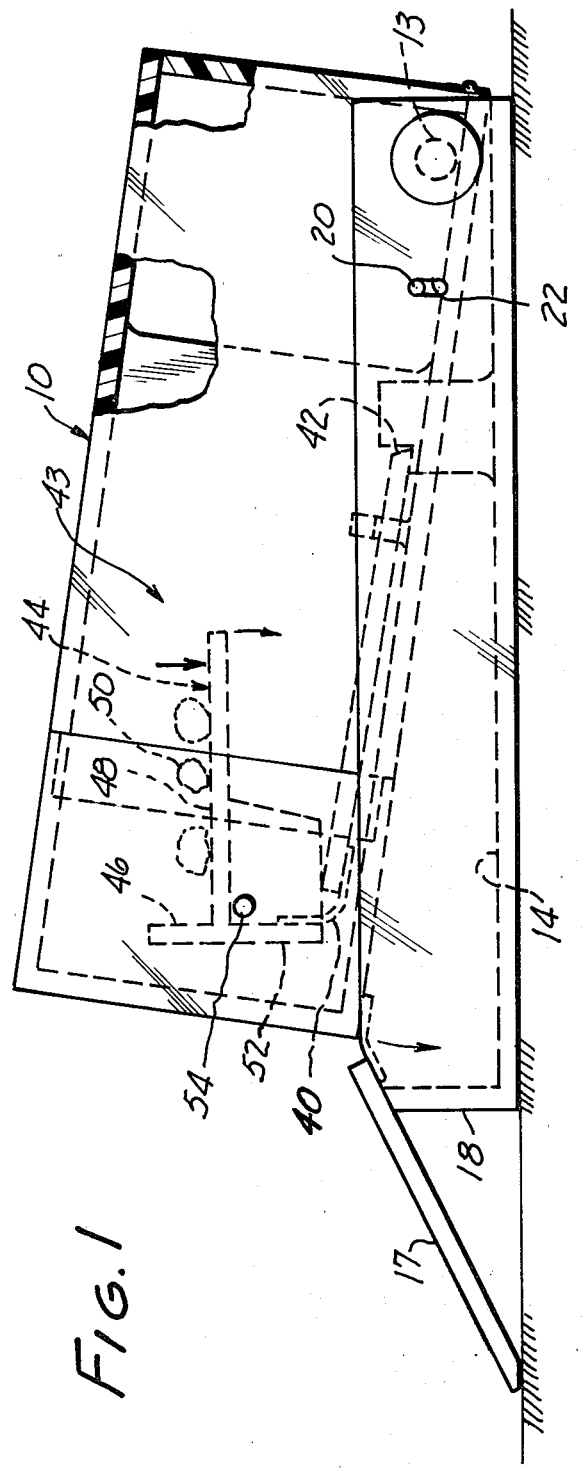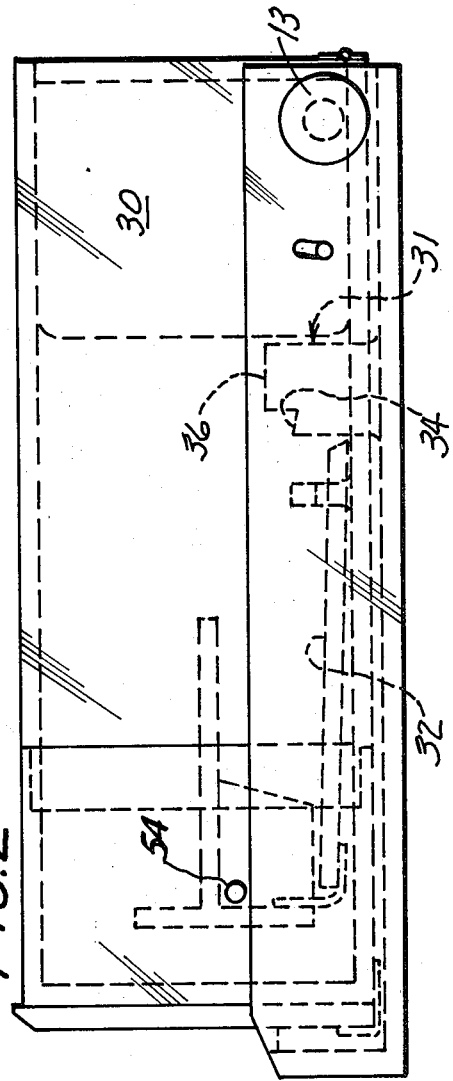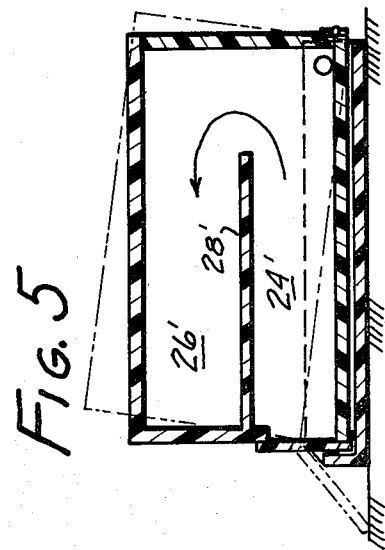

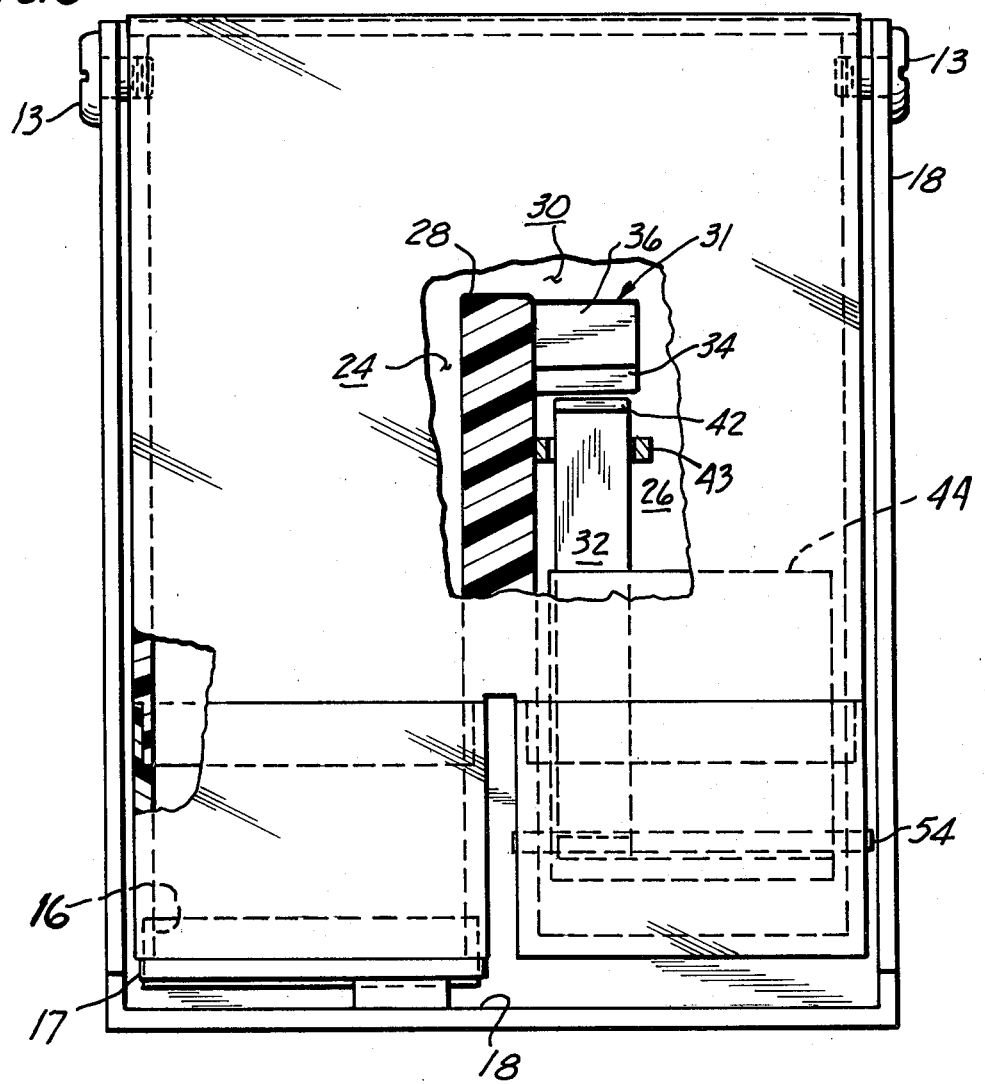
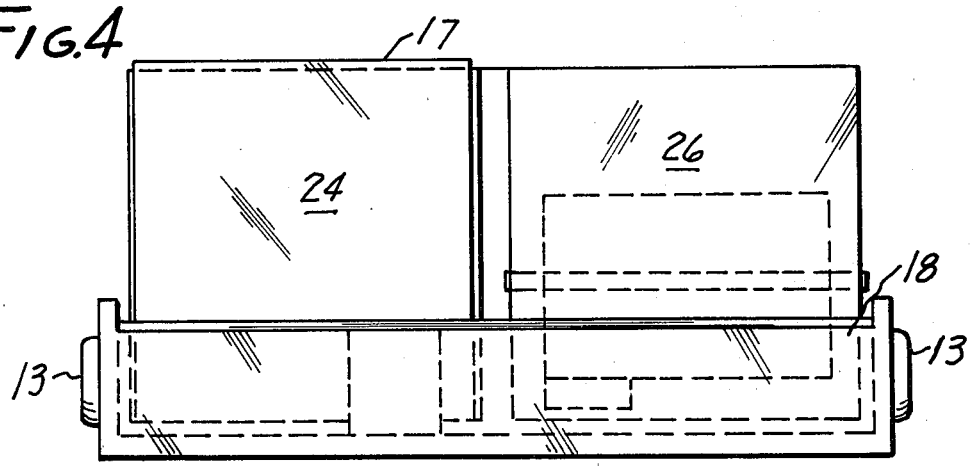

RODENT TRAP

FIELD OF THE INVENTION

This invention relates to rodent traps.

BACKGROUND OF THE INVENTION

This invention relates to a rodent trap which captures a rodent inside an enclosure for a quick and humane death, and for sanitary disposal.

Present methods of capturing or disposing of rodents are usually cruel and are generally unsightly and unsanitary. One known method includes a trap which as a spring operated bar for killing the rodent by impact. The bar is released by a trigger which is baited. This trap is dangerous to humans and pets as well as to rodents, because they can all be struck by it. Furthermore, because mice and other rodents are typically nocturnal animals, such devices most frequently capture the animals at night or when people are not around. As a consequence, the rodent may remain in the trap for many hours before removal and disposal. In addition to being unsightly, this is unsanitary as rodents are known to carry disease-causing fleas and lice which leave the carcass on death, and bacteria which can spread after the animal is killed. These can be serious problems around food handling areas.

Another method of killing the rodents is by using poison bait. This method commonly uses an anticoagulant biat which kills the rodent and sometimes dehydrates it. The baited traps are quite dangerous to children and pets because they may be tempted to taste the bait. Another disadvantage of this method is that the rodent might crawl into some inaccessible area after eating the poison and die there. This frustrates the disposal and can cause a stench.

The purpose of the present invention is to provide a rodent trap whose presence does not constitute a risk to humans and pets, is easy to use and of simple construction, humanely kills the rodent, and enables the sanitary disposal of the dead rodent.

BRIEF DESCRIPTION OF THE INVENTION

The present invention is comprised of an enclosure which tilts toward a base plate when a trigger in the enclosure is activated by a rodent which has entered the enclosure. The enclosure is divided into two chambers. There is a doorway into one of the chambers, and a trigger in the other. The enclosure is hinged to the base so it can tilt upwardly to open the doorway. Bait is placed on the trigger, and latch means holds the enclosure in this "ready" position. A rodent enters the first chamber through the open doorway and crawls into the second chamber hoping to eat the bait. The pathway in the chamber is long enough to accept him and his tail. When he places his weight on the trigger mechanism to taste the bait, the trigger releases the latch means, and the enclosure tilts downwardly, closing the doorway. The rodent will very quickly die of lack of oxygen or heat prostration, and need not endure physical blows or piercing points.

The above and other features of this invention will be fully understood from the following detailed descriptions and the accompanying drawings, in which:

BRIEF DESCRIPTION OF THE DRAWINGS

FIG. 1 is a side view of the preferred embodiment of a rodent trap according to the invention in the "ready" (set) position;

FIG. 2 is a side view of the rodent trap of FIG. 1 in its tripped position;

FIG. 3 is a top view of FIG. 1 partly in cutaway cross-section;

FIG. 4 is a right hand end view of FIG. 2; and

FIG. 5 is a modification of the invention.

DETAILED DESCRIPTION OF THE INVENTION

In FIGS. 1-4 there is shown an enclosure 10 hingedly (tiltably) connected by horizontal pins 13 to a base 14 having a flange 18. The enclosure is tiltable downwardly toward the base 14 so that a doorway 16 (FIG. 3) in the enclosure can be closed by a door such as flap 17. The enclosure is box-like, with a top 18, a bottom 19, and a peripheral sidewall 19a. Doorway 16 is formed in an end face 19b of the sidewall. A flange or lip on the base plate causes this closure to occur when the enclosure tilts downwardly. The flap is lightweight and offers only inconsequential resistance to the downward tilting movement.

Enclosure 10 includes a pin 20 engaging an arcuate slot 22 in the frame. It acts as a limit stop to limit the extent of upward tilting of the enclosure.

Enclosure 10 is divided into two side-by-side chambers 24 and 26 (see FIG. 3) by partition 28 which has an opening at the end 30 farthest from the entrance 16. As an alternative, the enclosure could have lower and upper chambers 24' and 26' separated by partition 28' as shown in FIG. 5. The purpose of providing two chambers and the partition is to make the trap more compact while forming a chamber long enough to receive the rodent, tail and all. A straight line, single chamber is useful, but it is excessively long and more troublesome to use.

Latching means 31 is provided, comprised of a latch arm 32 for engaging a stop 34 on post 36 that is attached to the bottom of base 14. Latch arm 32 is operated by resilient flexible self-hinge 40 which biases end 42 of the latch arm into engagement with stop 34 when the enclosure is unfolded (tilted upwardly) from the base plate. Arm 32, restrained by arch 43 against movement away from the bottom of the chamber, rests atop stop 34 to hold the enclosure in the raised position until the latch mechanism is released. The latch mechanism is substantially the same for the device of FIG. 5 although not shown. The term "self-hinge" means that the hinge is a continuous piece of material integral with the two parts which it interconnects and hingedly joins. The cast strip is such a hinge.

Trigger means 43 is provided in the form of a shelf 44 having a wall 46 that forms a cup-like area 48 in which bait 50 can be placed. Shelf 44 is connected by a short arm 52 through self-hinge 40 to latch arm 32. Shelf 44 is pivotally retained by pin 54.

In operation, bait 50 is placed in cup 48 and the enclosure 10 is lifted (tilted) up. Flap 17 can be pulled on for this purpose. When the enclosure 10 is fully lifted, the flap can drop to the position shown in FIG. 1. The thin strip of resilient flexible material forming self-hinge 40 will bias latch arm 32 into engagement with stop 34 on post 36. Thus, enclosure 10 is retained in the open position illustrated in FIG. 1, and the trap is set ("ready").

A rodent may now enter chamber 24 through doorway 16 and pass around end 30 of partition 28 and into chamber 26 to get at bait 50. When the rodent puts his weight on the shelf or trigger 44, latch arm will be pulled back, thereby releasing end 42 of the latch arm from stop 34 and enabling the enclosure 10 to tilt downwardly as a consequence of its weight plus the weight of the rodent toward base plate 14 as shown in FIG. 2. Flange 18 rotates flap 17 to close the doorway, and holds the flap against the doorway. A rodent trapped in the enclosure will very soon expire from lack of oxygen, or from heat prostration. Because the rodent is completely enclosed it may now be easily and quickly disposed of in a sanitary manner by simply throwing away this low-cost trap.

The trap of FIG. 5 will be used when a short, narrow construction is desired. Instead of the horizontally disposed horizontally-wider U-shaped path for the rodent as shown in FIG. 1, the U-shaped path is laid vertically on its side. A rodent is suprisingly flexible and readily negotiates the path, whichever way it is disposed. The length of the path is arbitrary, but usually will be about six inches long so as to receive an average mature household mouse. However, even should its tail be caught in the doorway, there will still be a sufficient closure physically to trap the rodent and suffocate it or cause it to die of heat prostration. The latter phenomenon occurs with surprising swiftness when there is no circulation of air and the rodent becomes concerned about its surroundings.

Closure of the doorway is shown to be completed with flap 17 acting as a closure. When the enclosure tilts downwardly, lip 18 swivels the flap upwardly and toward the enclosure so as to cover the doorway. If desired, the doorway can be encircled by a light, flexible seal (not shown) which contacts the flap when closed to make a more air-tight seal. Alternately, this seal could be formed on the flap itself. Absolute air tightness is not necessary, but is helpful in securing the quick and humane death of the rodent. Some air leakage is tolerable and an air-tight closure is not necessary.

Flap 17 provides a ramp for the rodent to ascend in order to enter the enclosure. Such an arrangement is helpful in attracting the common mouse, but is not necessary. A mouse is very curious, and tends to investigate any closed place, especially when it can sense food or bait inside. Instead of providing a hinged flap in the nature of a door to close the doorway, and a ramp for the rodent, the height of lip 18 may be increased so that when the enclosure rests against the base plate, the lip will occlude the doorway at least to the extent that the rodent cannot escape, and preferably to the extent that there will be insufficient air circulation to prevent suffocation or heat prostration. Thus, the lip itself can act as a closure means. The term "closure" is not limited to air tightness, but includes a leaking occlusion which physically traps the rodent. While many or even most persons will prefer to dispose of the trap along with the dead rodent, this trap is readily adapted for sanitary removal of the dead rodent, and reuse. For this purpose, the rear wall can be made as a removable plate. When it is removed, the rodent can simply be dumped out of the enclosure, and then the plate can be replaced and the trap reset.

Parts of this trap are readily manufactured by simple and straightforward molding and cutting processes. The assembly procedures are generally snap or adhesive types. This trap, with all of its advantages can be manufactured competitively with conventional traps which have far fewer advantages.

This invention is not to be limited to the embodiments shown in the drawings and described in the description which are given by way of example and not of limitation, but only in accordance with the scope of the appended claims.

I claim:
1. A rodent trap comprising:
   a base;
   an enclosure including a top, a bottom, and a peripheral side wall that forms an end face with a doorway through it, hingedly mounted to said base for angularly tilting movement relative thereto, said enclosure being angularly movable between a ready position tilted relative to said base with the doorway open and a closed position closer to said base with the doorway closed, said hinged mounting being disposed adjacent to the end of said enclosure farthest removed from said end face;
   closure means adapted at least partially to occlude said doorway when the enclosure is in said closed position;
   latch means interposed between said enclosure and said base, adapted to hold said enclosure in said ready position, said latch means comprising a post rising from said base through the bottom of said enclosure to form a stop, a latch arm extending along the bottom of said enclosure movable to a first position on and a second position off of said stop to support said enclosure in said ready position and to allow it to lower to the said closed position, respectively, and bias means biasing said latch arm toward said first position; and
   trigger means inside said enclosure adapted to receive a bait, said trigger means being linked to said latch arm to move said latch arm from its first to its second said position whereby to permit the enclosure to tilt downwardly to said closed position as a consequence of its weight plus the weight of the rodent, whereupon said closure means at least partially occludes said doorway, trapping the rodent and suffocating it, said trigger means comprising a shelf pivotally supported in said enclosure, and means connecting said trigger means to said latch arm.

2. Apparatus according to claim 1 in which said enclosure contains a pair of chambers, said doorway being located in one, and said trigger means in the other, said chambers being interconnected to provide an elongated path between doorway and said trigger means.

3. Apparatus according to claim 1 in which said closure means comprises a flap which is hingedly mounted to said enclosure, and in which said base includes means for closing said flap when said enclosure is in said closed position.

4. Apparatus according to claim 1 in which said closure means comprises a lip in adjacency to said doorway when said enclosure is in said closed position.

5. Apparatus according to claim 1 in which said connecting means connecting said trigger means to said latch arm comprises a self-hinge.

6. Apparatus according to claim 5 in which said biasing means is a said self-hinge.

7. Apparatus according to claim 6 in which said self-hinge is comprised of a thin strip of resilient flexible material which when flexed will exert a bias force.

8. Apparatus according to claim 2 in which said chambers are side by side.

* * * * *